July 16, 1935. W. DIESENDORF 2,008,544

PROTECTIVE ARRANGEMENT

Original Filed Nov. 27, 1933 2 Sheets-Sheet 1

Inventor:
Walter Diesendorf,
by Harry E. Dunham
His Attorney.

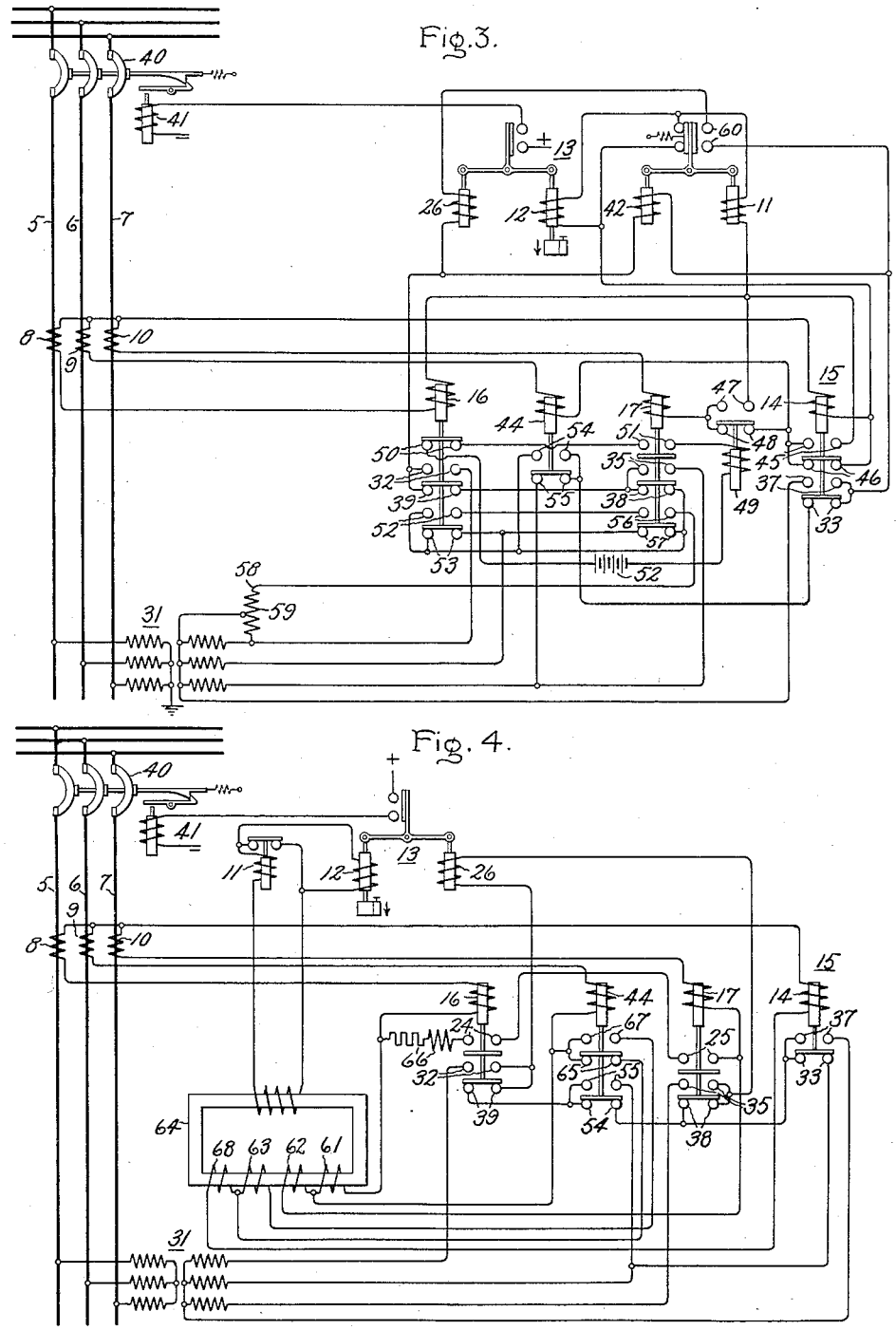

Patented July 16, 1935

2,008,544

UNITED STATES PATENT OFFICE 2,008,544

PROTECTIVE ARRANGEMENT

Walter Diesendorf, Vienna, Austria, assignor to General Electric Company, a corporation of New York Application November 27, 1933, Serial No. 699,956. Renewed May 31, 1935. In Germany December 15, 1932

8 Claims. (Cl. 175—294)

My invention relates to improvements in protective arrangements for electric systems and more particularly to improvements in protective arrangements wherein selectivity is obtained on the basis of the distance of a fault from the stations of the system. An object of my invention is to provide for polyphase alternating current electric systems a distance type of protective arrangement wherein only a single distance type relay is necessary for protection against faults regardless of the number of phase conductors involved in a fault.

My invention will be better understood from the following description when considered in connection with the accompanying drawings and its scope will be pointed out in the appended claims.

Figure 1:
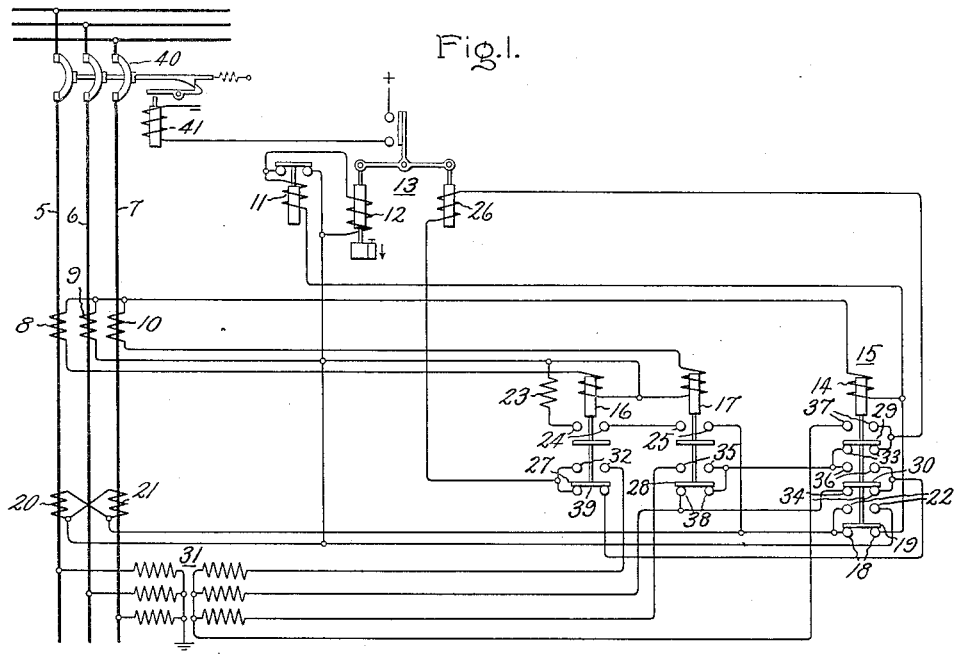
Figure 2:
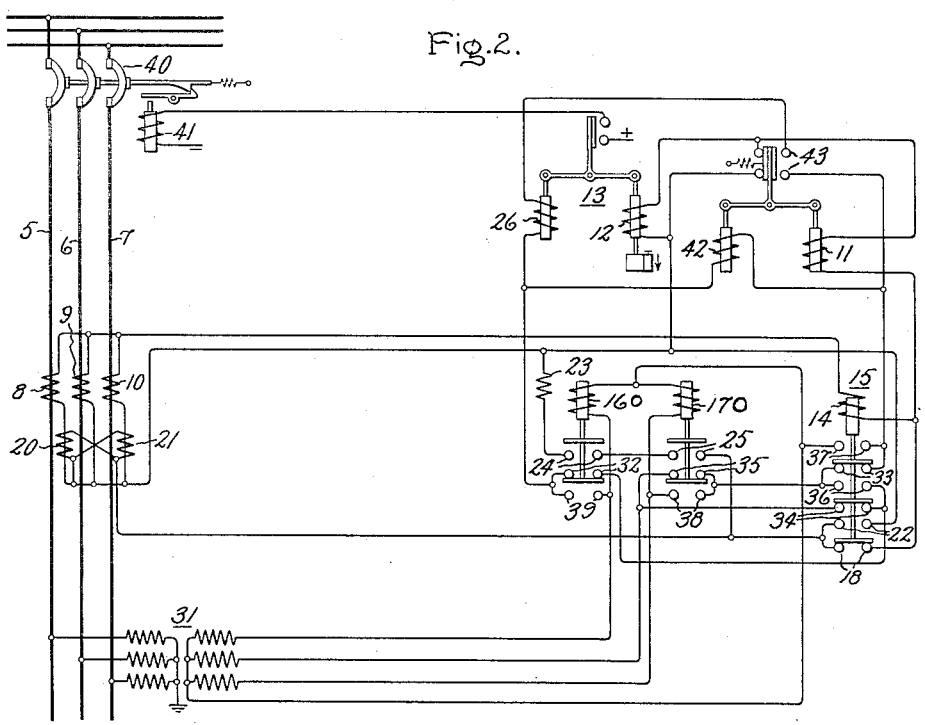

In the accompanying drawings, Fig. 1 illustrates diagrammatically a distance type of protective arrangement embodying my invention; Figs. 2, 3 and 4 illustrate diagrammatically protective arrangements embodying modifications of my invention.

In accordance with my invention, in order to obtain correct distance response with only one distance relay regardless of the number of phase conductors involved in the fault, I provide means for insuring a substantially constant distance factor measurement or time of operation for all faults at a given location on the basis that each different kind of fault has of itself the same impedance characteristic, for example the same ohmic impedance, resistance or reactance depending on which one of these the relay is designed for operation. In this connection I provide means which, on the occurrence of a ground fault, change the current excitation of the relay from phase conductor current to asymmetrical or zero phase current and the potential excitation from voltage between phase conductors to voltage from a phase conductor to ground.

Referring now to Fig. 1, there are installed in a three-phase circuit 5, 6, 7 three current transformers 8, 9 and 10 asymmetrically connected through the current windings 11, 12 of the starting and timing elements respectively of a distance type relay 13 and the winding 14 of a ground or zero phase sequence current relay 15. The circuit 5, 6, 7 is shown as arranged to be controlled by a latched closed type of circuit breaker 40 having a trip coil 41. Auxiliary relays 16 and 17 have their energizing windings directly connected in series with the current transformers 8 and 10 so as to be energized in accordance with the currents in the phases. The distance relay windings 11 and 12 are further connected at their end points through contacts 18 of ground relay 15 and bridging member 19 to two cross-connected current transformers 20 and 21 in the phase conductors 5 and 7 respectively. The bridging member 19 is operated by the ground relay 15 in such a manner that when it bridges the contacts 22, the current transformers 20 and 21 are short-circuited. An impedance 23 arranged in parallel with the current windings of the distance relay 13 is connected in circuit on the simultaneous operation of the relays 16 and 17 through their series related contacts 24 and 25, respectively. The voltage winding 26 of the distance relay 13 is arranged to be connected by the bridging members or contacts 27, 28, 29 and 30 associated with the relays 15, 16 and 17 to a polyphase potential transformer 31 in a manner which will appear in connection with the explanation of the operation of the protective arrangement. The contacts for the voltage circuit are so arranged that the voltage coil, in case of a fault between two phase conductors, is energized by the voltage between the affected conductors and, in case of a fault between one phase conductor and ground, by the voltage to ground of the affected phase conductor.

In case of a short circuit between phase conductors 5 and 6, a current dependent on the fault current in the phase conductor 5 will appear in the current windings 11 and 12 of the distance relay 13 from the current transformer 20. The overcurrent relay 16 will respond and through its bridging member 27 close its contacts 32. The ground relay 15 will not operate and its contacts 18, 33 and 34 will remain closed, as shown. Consequently, the voltage coil 26 of the distance relay 13 is connected to be energized from the potential transformer 31 in accordance with the voltage between the phase conductors 5 and 6 in an energizing circuit including the contacts 32 of the relay 16, the contacts 33 of the relay 15 and the contacts 38 of the relay 17. In case of a fault between the phase conductors 6 and 7, the current windings 11 and 12 of the distance relay 13 will be energized in accordance with the current of the phase conductor 7 through the current transformer 21. The voltage winding 26 of the distance relay 13 will be connected to be energized from the potential transformer 31 in accordance with the voltage between the phase conductors 6 and 7 in a circuit including the contacts 35 of the overcurrent relay 17, the contacts 33 of the relay 15, the contacts 39 of the relay 16 and the contacts 34 of the relay 15. In case of a fault between the phase conductors 5 and 7, the current transformers 20 and 21 together provide twice as much fault current excitation as either one separately as in the preceding cases. In order that this amount of fault current may not be effective in the distance relay, the contacts 24 and 25 of the relays 16 and 17, respectively, are closed and through the impedance 23 to form a circuit in parallel to the current windings 11 and 12 of the distance relay so as to reduce the amount of current supplied to these windings to one half of the fault current as reflected in the two current transformers 20 and 21. Obviously, the operation of the contacts 24 and 25 may be effected either through electrical or mechanical dependence of the over-current relays 16 and 17. The voltage coil 26 will be connected to be energized from the potential transformer 31 in accordance with the voltage between the phase conductors 5 and 7 in a circuit through the contacts 32 of the overcurrent relay 16, the contacts 33 of the relay 15 and the contacts 35 of the overcurrent relay 17. In case of a fault involving all of the phase conductors 5, 6 and 7, the overcurrent relays 16 and 17 will close their contacts 24, 32 and 25, 35, respectively. The current windings of the distance relay will accordingly receive one half of the current reflected in the current transformers 20, 21 and the voltage winding 26 will be energized from the potential transformer 31 in accordance with the voltage between the phase conductors 5 and 7. Thus, in all faults involving at least two phase conductors, the relay 13 is controlled in accordance with twice the phase impedance between the point at which the relay is located and the point of fault.

In case of a fault to ground on any phase conductor, the relay 15 responds to close its contacts 22, 36 and 37. The current windings 11 and 12 of the distance relay 13 are thus disconnected from the current transformers 20 and 21 and are connected to be energized by the asymmetrical or zero phase sequence current reflected in the current transformers 8, 9 and 10. At the same time the voltage winding 26 is connected through the contacts 37 of the relay 15 to the neutral of the secondary windings of the potential transformer 31 and through the contacts of the relays 15, 16 and 17 to a voltage corresponding to the voltage to ground of the phase conductor affected by the fault. Thus, for a ground fault on phase conductor 5 the relays 15 and 16 operate and the circuit of the voltage winding 26 is energized by the voltage to ground of the phase conductor 5 through a circuit which includes the contacts 37 of the relay 15 and the contacts 32 of the relay 16. For a ground fault on the phase conductor 6 only the relay 15 operates and the voltage winding 26 is energized in accordance with the voltage to ground of the phase conductor 6 through a circuit which includes the contacts 36 and 37 of the relay 15, the contacts 38 of the relay 17 and the contacts 39 of the relay 16. For a ground fault on the phase conductor 7, the relays 15 and 17 operate. In this case the voltage winding 26 is energized in accordance with the voltage to ground of the phase conductor 7 through a circuit which includes the contacts 36 and 37 of the relay 15, the contacts 39 of the relay 16 and the contacts 35 of the relay 17.

It has been assumed that on the occurrence of short circuits the current in the path from the location of the selective relay to the short circuit or fault point will meet the same impedance in the phase conductor as on the return path through ground or through a neutral conductor. This is generally the case but when short circuit reactances are installed in the network, then with a fault between two phase conductors, the current will on its outgoing and return path in the phase conductors flow twice through the conductor impedance and twice through the reactances while in case of a line to ground fault it will pass only once through the conductor impedance on its outgoing path and the reactance and on its return path through the ground conductor which may be assumed to be equal to the phase conductor impedance. In this case the impedance of the reactance coil is effective but once. Consequently, the selective relay will measure a distance from the fault which is too small. In order to avoid this in case of a ground fault the current which is active in the current windings of the distance relay should be reduced as compared with the actual value of the asymmetrical current in the same ratio as that of the impedance of the current loop, $(Z+Z_E)$ with a ground fault to the impedance of the current loop $2Z$ in case of a fault between two phase conductors, $Z$ and $Z_E$ being the impedances of the phase conductor and the ground return, respectively. This can be done by constructing the transformers 8, 9 and 10 which supply the asymmetrical current to have a correspondingly higher transformation ratio than the transformers 20 and 21 which furnish a measure of the fault current in case of a fault between two phase conductors. When current transformers having the same transformation ratio are used, the same result can be obtained by connecting in the asymmetrical circuit an intermediate current transformer having the corresponding transformation ratio. The difference between the impedances $2Z$ and $Z+Z_E$ in case of a fault between phase conductors and a fault between a phase conductor and ground, respectively, may, however, be compensated by increasing the voltages to ground supplied. An intermediate potential transformer should have a ratio of $$\frac{2Z}{Z+Z_E}.$$

Obviously the distance relay may be furnished with two current windings, one of which is connected in the asymmetrical circuit and the other to the current transformers 20 and 21 in the arrangement shown. The arrangement of the contacts, however, remains the same. Moreover, it is further possible in designing the windings to allow for the different impedances in case of a fault between phase conductors and a fault between a phase conductor and ground.

In order to reduce the cost of the equipment, it is possible to use but three high voltage current transformers, as shown in Fig. 2. In this case the current transformers 20 and 21 are connected in the secondary circuits of the transformers 8 and 10, considerable allowance being made for the transformation ratio. The connections are otherwise the same. In the embodiment of my invention shown in Fig. 2, however, instead of using the overcurrent starting relays 16 and 17, I have shown undervoltage starting relays 160 and 170 which are connected to be energized from those secondary windings of the potential transformer 31 which are associated with the phase conductors 5 and 7. Also the starting element of the distance relay 13, in addition to the current winding 11, is provided with an opposing voltage winding 42 by means of which overcurrent starting dependent upon the voltage is obtained as is desirable in networks having different possible short circuit currents in accordance with the connected generating capacity. When the starting relay responds, the contacts 43 will be closed and the voltage winding 26 of the distance relay 13 energized.

In the embodiment of my invention shown in Fig. 3, only three current transformers 8, 9 and 10 are necessary. These are connected in star and are combined to form another star point through the windings of the overcurrent transfer relays 44 and 16, the star point being connected through the current windings 11 and 12 of the distance relay and through the current winding 14 of the ground relay 15 to the first star point of the current transformers. The ground relay 15 includes contacts 45 and 46 for controlling the circuits of the current windings of the distance relay. In circuit with the winding of the overcurrent relay 17 are included contacts 47 and 48 of an auxiliary relay 49, the contacts 48 being connected between the overcurrent relays 17 and 44 and the contacts 47 being connected between the overcurrent relay 17 and the current windings of the distance relay 13. The auxiliary relay 49 is operated when a fault occurs between the phase conductors 6 and 7 because under these conditions the overcurrent relay 16 would be in the position shown with its contacts 50 closed and the overcurrent relay 17 will be energized to close its contacts 51 thereby completing the circuit of the relay 49 from a suitable source 52. Thus the auxiliary relay 49 is energized when overcurrent occurs in the phase conductor 7 if there is not at the same time an overcurrent condition in the phase conductor 5. Obviously a mechanical interlock in place of the electrical interlock shown can be used.

The voltage winding 26 of the distance relay 13 has its energizing circuit controlled with reference to the potential transformer 31 through the contacts 33, 37 of the ground current relay 15, the contacts 32, 39, 52 and 53 of the overcurrent relay 16, the contacts 54 and 55 of the overcurrent relay 44 and the contacts 35, 38, 56 and 57 of the overcurrent relay 17. The contact arrangement in the voltage circuit differs from that in Fig. 1 essentially in the fact that the normally open contacts 52 and 56 of the relays 16 and 17, respectively, are in circuit with one terminal 58 of an auxiliary transformer 59. This transformer is so constructed and arranged as to supply a voltage to the winding 26 of the same phase as the voltage to ground of the phase conductor 5 but double the magnitude thereof as reflected in the potential transformer secondary 31. In this way it is possible for the selective relay to measure twice the phase impedance in case of a fault involving all of the phase conductors 5, 6 and 7 as well as in the case of a fault involving only two of these phase conductors.

The operation of the embodiment of my invention shown in Fig. 3 is as follows: In case of a fault involving the phase conductors 5 and 6 or the phase conductors 5 and 7 or all of the phase conductors, neither the ground current relay 15 nor the auxiliary relay 49 is operated. The distance relay, therefore, receives current proportional to the current in the phase conductor 5 in each of these three cases of faults and the voltage coil 26 will be momentarily connected to be energized in accordance with the voltages between the phase conductors affected by the fault. Thus, with a fault involving the phase conductors 5 and 6 the circuit of the voltage coil 26 includes the contacts 32 of the overcurrent relay 16, the contacts 33 of the ground current relay 15, the contacts 54 of the overcurrent relay 44 and the contacts 57 of the overcurrent relay 17. With a fault involving the phase conductors 5 and 7, the energizing circuit of the voltage coil 26 includes the contacts 32 of the relay 16, the contacts 33 of the relay 15 and the contacts 55 of the relay 44. In case of a fault involving all of the phase conductors 5, 6 and 7, all of the overcurrent relays 16, 44 and 17 operate. In this case the voltage winding 26 of the distance relay is connected across the transformer winding 59 in a circuit which includes the contacts 32 of the overcurrent relay 16, the contacts 33 of the relay 15, the contacts 54 of the relay 44, the contacts 52 of the relay 16 and the contacts 56 of the relay 17. Consequently, the voltage coil 26 is energized in accordance with twice the line to line voltage, as previously explained. In case of a fault between the phase conductors 6 and 7 the auxiliary relay 49 will be energized because the contacts 50 of the relay 16 remain closed and the contacts 51 of the relay 17 are closed in response to the operation of this relay. As the result of the operation of the relay 49 both of the current transformers 8 and 10 will be connected to the current windings of the distance relay. Inasmuch as the phase conductor 5, however, is not carrying fault current, only the current of phase conductor 7 will be affected by the distance relay. In this case the voltage winding 26 of the distance relay will be connected to be energized in accordance with the voltage between the phase conductors 6 and 7 in a circuit which includes the contacts 35 of the relay 17, the contacts 32 of the relay 16, the contacts 33 of the relay 15, the contacts 54 of the relay 44 and the contacts 53 of the relay 16.

In every case of a fault to ground, the relay 15 will operate. Thus, in each case of a fault to ground, regardless of whether or not the auxiliary relay 49 is operated, the current windings 11 and 12 of the distance relay will be connected between the two points common to the current transformers 8, 9 and 10 and will, therefore, be energized in accordance with the asymmetrical current. In consequence of the operation of the ground fault relay 15 and some one of the relays 16, 44, 17 depending upon the phase conductor affected by the ground fault, the voltage winding 26 of the distance relay will be connected to be energized in accordance with the phase voltage which is affected by the ground fault. This also applies to the voltage winding 42 of the starting element which is connected in parallel with the voltage winding 26. Thus, for a ground fault on the phase conductor 5 the energizing circuit of the voltage winding 26 includes the contacts 32 of the relay 16 and the contacts 37 of the relay 15. In case of a fault to ground on the phase conductor 6, the circuit of the voltage winding 26 includes the contacts 57 and 38 of the relay 17, the contacts 39 of the relay 16 and the contacts 37 of the relay 15. For a ground fault on the phase conductor 7 the energizing circuit of the voltage winding 26 includes the contacts 35 of the relay 17, the contacts 39 of the relay 16 and the contacts 37 of the relay 15. In every case, therefore, the relay will measure twice the phase impedance in case of a ground fault as in the case of a fault between phase conductors.

In the embodiment of my invention illustrated in Fig. 3, the voltage winding 26 of the distance relay is energized by the response of the starting element through the contacts 60 thereof to set the distance relay in operation.

In the protective arrangement shown in Fig. 4 in order to obtain fault currents, three windings, 61, 62, 63, are arranged on a common iron core 64. The winding 61 is connected between the current transformers 8 and 9 and the winding 62 is connected between the current transformers 9 and 10. The common point between the windings 61 and 62 which is connected to the current transformer 9 is normally connected to the neutral point of the current transformers 8 and 10 through the contacts 65 of the relay 44. The shunt impedance 66 is connected between the end of the winding 61 through the contacts 24 of the relay 16 and the contacts 25 of the relay 17. The contacts are closed on the simultaneous response of the relays 16 and 17. The voltage winding 26 of the distance relay is connected through contacts associated with the relays 15, 16, 44 and 17 to the potential transformer 31 in such a way that the voltage affected by the fault, whether it be between the phase conductors or from a phase conductor to ground, is momentarily effective in the distance relay.

In case of a fault between the phase conductors 5 and 6, fault current will appear only in the winding 61 and the overcurrent relay 44 will operate. However, as there is no asymmetrical current, the operation of this relay will have no effect. The voltage winding 26 will be connected to be energized in accordance with the voltage between phase conductors 5 and 6 in a circuit including the contacts 32 of the relay 16, the contacts 38 of the relay 17 and the contacts 33 of the relay 15. The operation of the relay 44 will have no effect so far as this is concerned. In case of a fault between the phase conductors 6 and 7, fault current will appear in the winding 62. The voltage winding 26 will be connected to be energized in accordance with the voltage between the phase conductors 6 and 7 in a circuit including the contacts 55 of the relay 44, the contacts 39 of the relay 16 and the contacts 35 of the relay 17. In case of a fault between the phase conductors 5 and 7, fault current will appear in the windings 61 and 62. Due, however to the operation of the relays 16 and 17, the shunt impedance 66 will be connected in circuit through the contacts 24 of the relay 16 and the contacts 25 of the relay 17. The current, therefore, will be reduced to the same value as in the case of a fault between the phase conductors 5 and 6 or 6 and 7. The voltage winding 26 will be connected to be energized in accordance with the voltage between the phase conductors 5 and 7 in a circuit including the contacts 32 of the relay 16 and the contacts 35 of the relay 17. In case of a fault involving all of the phase conductors 5, 6 and 7, the conditions are the same as for a fault between the phase conductors 5 and 7.

In case of a fault to ground on the phase conductor 5, ground fault current will appear in the winding 61. In case of a ground fault on the phase conductor 7, ground fault current appears in the winding 62. In case of a fault to ground on the phase conductor 6, the relay 44 will operate and through its contacts 67 connect the winding 63 in circuit to be energized in accordance with the fault current in the phase conductor 6.

For the purpose of adding the proper amount of zero sequence current to the actual phase current excitation of the windings 61 or 62 or 63 there may be included a winding 68 so as to insure that the indicated distance of the relay in case of line to ground faults is correct where line to ground potential excitation is used for the voltage coils of the distance relay. In case of a ground fault on the phase conductor 5, the relays 16 and 15 will operate and the voltage winding 26 will be energized in accordance with the voltage to ground of the phase conductor 5 in a circuit including the contacts 32 of the relay 16, contacts 38 of the relay 17 and the contacts 37 of the relay 15. In case of a line to ground fault on the phase conductor 6 the relays 44 and 15 will operate and the voltage coil 26 of the distance relay will be connected to be energized in accordance with the voltage to ground of the phase conductor 6 in a circuit including the contacts 55 of the relay 44, the contacts 39 of the relay 16, the contacts 38 of the relay 17 and the contacts 37 of the relay 15. In case of a ground fault on the phase conductor 7, the relays 17 and 15 will operate and the voltage winding 26 will be connected to be energized in accordance with the voltage to ground of the phase conductor 7 in a circuit including the contacts 35 of the relay 17, the contacts 39 of the relay 16, the contacts 54 of the relay 44 and the contacts 37 of the relay 15. The arrangement shown in Fig. 4 has the advantage over the other arrangements in that the transfer contacts 65, 67 come into operation only in a single short circuit case. Obviously, the windings 61, 62 and 63 may be directly associated with the distance relay or with an intermediate transformer through the secondary winding of which the distance relay is connected.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States is:—

1. In a protective arrangement for a polyphase alternating current circuit wherein selectivity is obtained on the basis of the location of a fault, a single phase distance relay having current and voltage windings connected to be energized from the circuit and means responsive to abnormal circuit conditions for controlling the connections of said current and voltage windings to maintain the distance response characteristic of said relay substantially constant for faults at a given location independently of the number of phase conductors involved in said faults.

2. In a protective arrangement for a three-phase alternating current circuit wherein selectivity is obtained on the basis of the location of a fault, a single-phase distance relay having current and voltage windings connected to be energized from the circuit and fault responsive means connected to be energized from said circuit for controlling the connections of said current and voltage windings to maintain the distance response characteristic of said relay substantially constant for single-phase faults, three-phase faults and ground faults at a given location.

3. In a protective arrangement for a polyphase alternating current circuit wherein selectivity is obtained on the basis of the location of a fault, a single-phase distance relay having current and voltage windings connected to be energized from said circuit and means for controlling the connections of said current and voltage windings to maintain the distance response characteristic of said relay substantially constant for faults at a given location independently of the number of phase conductors involved in said faults including a relay connected to be energized in accordance with the zero phase sequence component of the circuit current and at least two relays respectively connected to be energized in accordance with the currents of two phase conductors of the circuit.

4. In a protective arrangement for a polyphase alternating current circuit having a grounded neutral wherein selectivity is obtained on the basis of the location of a fault, a single-phase distance relay having current and voltage windings and means responsive to abnormal circuit conditions for connecting the current winding of the distance relay for energization in accordance with the current in a faulted phase conductor of the circuit for faults between phase conductors and in accordance with the asymmetrical current of the circuit for ground faults and for connecting the voltage winding for energization in accordance with the voltage most affected by the fault to maintain the distance response characteristic of the relay substantially constant for faults at a given location independently of the number of phase conductors involved in said faults.

5. In a protective arrangement for a polyphase alternating current circuit wherein selectivity is obtained on the basis of the location of a fault, a single-phase distance relay having current and voltage windings connected to be energized from said circuit and means for controlling the connections of said current and voltage windings to maintain the distance response characteristic of said relay substantially constant for faults at a given location independently of the number of phase conductors involved in said faults including a relay connected to be energized in accordance with the zero phase sequence component of the circuit current.

6. In a protective arrangement for a polyphase alternating current circuit wherein selectivity is obtained on the basis of the location of a fault, a single distance relay comprising a distance element having current and voltage windings and a starting element having a current winding, the windings of said elements being connected to be energized from said circuit and means responsive to abnormal circuit conditions for connecting the current windings of said elements for energization in accordance with the current in a faulted phase conductor of the circuit for faults between phase conductors and in accordance with the asymmetrical current of the circuit for ground faults, said responsive means including means for connecting the voltage winding of the distance element for energization in accordance with the voltage most affected by the fault.

7. In a protective arrangement for a polyphase alternating current circuit wherein selectivity is obtained on the basis of the location of a fault, a single-phase distance relay having current and voltage windings connected to be energized from the circuit and means responsive to ground faults on the circuit for selectively effecting the energization of said current winding in accordance with the current of the grounded phase conductor and for selectively effecting the energization of the voltage winding in accordance with the voltage most affected by the fault.

8. In a protective arrangement for a polyphase alternating current circuit wherein selectivity is obtained on the basis of the location of a fault, a single phase distance relay having current and voltage windings connected to be energized from the circuit and means responsive to interphase and ground faults for selectively effecting the energization of said current winding in accordance with the fault current and for selectively effecting the energization of the voltage winding in accordance with the voltage affected by the fault.

WALTER DIESENDORF.